(12) United States Patent
Goetz et al.

(10) Patent No.: US 11,407,319 B2
(45) Date of Patent: Aug. 9, 2022

(54) METHOD AND APPARATUS FOR CHARGING AN ENERGY STORE

(71) Applicant: Dr. Ing. h.c. F. Porsche Aktiengesellschaft, Stuttgart (DE)

(72) Inventors: Stefan Goetz, Forstern (DE); Hermann Helmut Dibos, Remchingen (DE); Malte Jaensch, Bietigheim-Bissingen (DE); Eduard Specht, Bruschsal (DE); Christian Korte, Karlsruhe (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 47 days.

(21) Appl. No.: 16/756,879

(22) PCT Filed: Jun. 7, 2018

(86) PCT No.: PCT/EP2018/025149
§ 371 (c)(1),
(2) Date: Apr. 17, 2020

(87) PCT Pub. No.: WO2019/076479
PCT Pub. Date: Apr. 25, 2019

(65) Prior Publication Data
US 2021/0197676 A1   Jul. 1, 2021

(30) Foreign Application Priority Data
Oct. 17, 2017   (DE) .................... 10 2017 124 122.1

(51) Int. Cl.
*H02J 7/16* (2006.01)
*B60L 53/122* (2019.01)
(Continued)

(52) U.S. Cl.
CPC ............. *B60L 53/122* (2019.02); *B60L 53/62* (2019.02); *H02J 7/007182* (2020.01)

(58) Field of Classification Search
USPC ........................................................ 320/137
See application file for complete search history.

(56) References Cited

U.S. PATENT DOCUMENTS 9,705,341 B2 *   7/2017   Komatsu ............... H02J 7/0014
10,186,861 B2   1/2019   Rapp et al.
(Continued)

FOREIGN PATENT DOCUMENTS

DE   10 2010 052 934   5/2012
DE   10 2011 003 859   8/2012
(Continued)

OTHER PUBLICATIONS

U.S. Pat. No. 10,186,861 is the US equivalent of DE 10 2013 212 682.
(Continued)

*Primary Examiner* — Samuel Berhanu
(74) *Attorney, Agent, or Firm* — Gerald E. Hespos; Michael J. Porco

(57) ABSTRACT

An energy store (14*a*) has at least three energy storage sections (u, v, w) and at least two switching elements. Each energy storage sections (u, v, w) has multiple energy storage modules and each energy storage module has at least one energy storage element that receives and stores energy from an energy source (12). The energy store (14*a*) is connected to a first coil (50) so that a voltage induced in the first coil (50) is used to charge the energy storage elements. The energy store (14*a*) is matched to properties of the voltage provided by the first coil (50) by switching the switching elements. As a result, the energy storage modules of an energy storage section (u, v, w) are connected in parallel and/or in series with one another and/or at least one energy storage module of at least one energy storage section (u, v, w) is bypassed.

11 Claims, 7 Drawing Sheets

(51) Int. Cl.
    *B60L 53/62*   (2019.01)
    *H02J 7/00*    (2006.01)

(56)       References Cited

U.S. PATENT DOCUMENTS 10,439,506  B2    10/2019   Goetz
 2003/0117109  A1*    6/2003    Trepka .................. H01M 10/46
                                                           320/126
 2013/0314045  A1*   11/2013    Feuerstack ............ H02J 7/0024
                                                           320/116
 2013/0314046  A1*   11/2013    Feuerstack ............ H02J 7/0024
                                                           320/116
 2014/0226377  A1     8/2014    Goetz et al.
 2014/0340047  A1*   11/2014    Weissenborn .......... B60L 58/18
                                                           320/135
 2016/0368392  A1*   12/2016    Braun ..................... B60L 53/20
 2017/0080817  A1     3/2017    Hancasky et al.
 2017/0338668  A1*   11/2017    Sada ..................... H01M 10/443
 2018/0013339  A1     1/2018    Goetz
 2018/0219478  A1     8/2018    Goetz

FOREIGN PATENT DOCUMENTS

DE      10 2011 003 861         8/2012
 DE      10 2011 108 920         1/2013
 DE      10 2013 008 905        11/2014
 DE      10 2013 212 682        12/2014
 DE      10 2013 212 692        12/2014
 DE      10 2013 212 716        12/2014
 DE      10 2015 112 513         2/2017
 DE      10 2016 008 265         2/2017
 DE      10 2016 116 914         3/2017
 DE      10 2016 112 250         1/2018
 KR      10-2014-0040108         4/2014

OTHER PUBLICATIONS

U.S. Pat. No. 10,439,506 is the US equivalent of DE 10 2015 112 513.
US 2013/0314045 is the US equivalent of DE 10 2011 003 859.
US 2013/0314046 is the US equivalent of DE 10 2011 003 861.
US 2014/0226377 is the US equivalent of DE 10 2011 108 920.
US 2016/0368392 is the US equivalent of DE 10 2013 212 716.
US 2017/0080817 is the US equivalent of DE 10 2016 116 914.
US 2018/0013339 is the US equivalent of DE 10 2016 112 250.
International Search Report dated Aug. 8, 2018.
Korean Office Action dated Dec. 1, 2021.

* cited by examiner

METHOD AND APPARATUS FOR CHARGING AN ENERGY STORE

BACKGROUND

Field of the Invention

The invention relates to an apparatus for charging an energy store of a motor vehicle. Furthermore, the invention relates to a corresponding method for charging an energy store of a motor vehicle.

Related Art

To become independent or more independent of fossil fuels, modern vehicles are increasingly having electric motors installed in them that independently drive the vehicle or assist an existing internal combustion engine. The electric motors usually are supplied with power by one or more batteries. These batteries need to be charged after their energy reserve has been used up.

DE 10 2013 212 692 A1 discloses a system having an energy storage device and a DC voltage supply circuit. The energy storage device has at least two energy supply paths, and each of the energy supply paths has a multiplicity of energy storage modules connected in series. Two charging circuit connections of the DC voltage supply circuit that are connected in series with supply nodes can be used to connect a charging circuit. The charging circuit can have a current applied to its charging circuit connections and can be designed to provide a DC charging voltage or a pulsed charging voltage having a defined mean value for the energy storage modules of the energy storage device.

DE 10 2013 212 682 A1 and DE 10 2013 212 716 A1 disclose similar systems relating to the charging of battery modules.

The systems known from the prior art make a DC voltage available as a charging voltage for the energy store. This restricts the charging options for the energy store. Furthermore, a cable connection between energy store and charging energy source is required.

DE 10 2013 008 905 A1 discloses an energy storage module that has a storage battery arrangement and charging electronics completely surrounded by a housing. The storage battery arrangement is chargeable inductively via a coupling coil that is integrated in the housing, and there is provision for the output of energy from the storage battery arrangement exclusively inductively. In this instance, the energy storage modules are each situated within the induced magnetic field.

It is an object of the present invention to address at least one of the disadvantages of the prior art. In particular, the aim is to specify at least one option to allow wireless charging of the energy store. The aim is at least to propose an alternative to known solutions.

SUMMARY

The invention relates to a method for charging an energy store. The energy store has at least three energy storage sections, each of which has multiple energy storage modules. The respective energy storage modules comprise at least one energy storage element that receives and stores energy from an energy source, and at least two switching elements. The energy store is connected to a first coil, so that a voltage induced in the first coil is used to charge the energy storage elements of the energy storage modules of the energy store. The energy store is matched to properties of the voltage provided by the first coil by switching the switching elements. As a result, the respective energy storage modules of an energy storage section are each connected in parallel and/or in series with one another and/or at least one energy storage module of at least one energy storage section is bypassed.

US 2018/219478 from the applicant, the full extent of which is included herein by way of reference, discloses an energy storage module that has multiple such energy storage modules form an energy storage section and multiple such energy storage sections form the energy store. Preferably, the energy store has three energy storage sections, but a different number of energy storage sections is also possible. Three energy storage sections have the advantage that they allow the energy store to be connected easily to a known three-phase electrical system and thereby charged.

The particular refinement of the energy store or of the energy storage modules allows the individual energy storage modules of an energy storage section to be interconnected among one another without restriction. As a result, the energy store is matchable to the voltage provided by the first coil. The provided voltage is for example influenced by a number of windings of the first coil or by a number of windings of an external second coil. Properties that can vary and to which the energy store is matchable are for example the frequency, the rated value/RMS value and/or the maximum value of the voltage. Furthermore, faulty energy storage modules can be bypassed or intermediate voltages can be produced. A single module in accordance with the aforementioned patent application from the applicant allows what are known as two- and four-quadrant modules, which each permit a multiplicity of interconnection options, and at least the four-quadrant modules permit different directions of polarity.

The use of a coil to use an inductive charging method to input the energy or voltage charging the energy store allows a cable to which e.g. an energy store according to the invention in a vehicle needs to be connected to be dispensed with.

The electrical connection between the energy store and the first coil in one embodiment is routed via a charging connection apparatus for connection to an external energy source. This allows an additional switch apparatus controlling the input of the voltage induced by means of the coil to be dispensed with. As a result, the apparatus becomes lighter and the circuit is simplified.

In one embodiment, an energy storage section is connected electrically to the first coil. The particular refinement of the energy storage modules, i.e. the chosen number of switching elements arranged therein and the circuit options for the switching elements, allows a converter rectifying the voltage provided by the coil to charge the battery to be dispensed with. It is therefore possible for an AC voltage to be supplied to the energy store directly and immediately. The matching to the provided voltage is undertaken by the switching elements in the energy storage modules. This simplifies the circuit and charging of the energy store can be rendered less restricted and more variable.

A lower voltage than is provided by the first coil may be produced across a respective energy storage section by switching the switching elements of the energy storage modules. This produces a voltage gradient between the first coil and the energy store so that current or energy flows from the first coil to the energy store.

The first coil may be is assigned an, often external, second coil that is connected to an energy source. An interaction of the first coil, the second coil and the energy source, which is an AC voltage source, produces a magnetic alternating field that induces a voltage in the first coil. This voltage is used to charge the energy store. Consequently, an inductive charging method for charging the energy store is made possible.

The energy store may remain connected to a vehicle electrical system of a vehicle during a charging process. The tap on the vehicle electrical system can be used to control fuse elements, such as for example contactors in the circuit apparatus, as are yet to be described below.

The method is developed in that the energy store used is an AC battery. An AC battery is made possible for example by interconnecting single modules that are each disclosed in US 2018/219478 and in the German patent applications DE 10 2015 112 513 A1 and DE 10 2016 112 250 A1 from the applicant and, furthermore, in DE 10 2011 108 920 A1 and DE 10 2010 052 934 A1 and also in S. Goetz, A. Peterchev, T. Weyh (2015), Modular multilevel converter with series and parallel module connectivity: Topology and control, IEEE Transactions on Power Electronics, vol. 30, no. 1, pp. 203-215, doi: 10.1109/TPEL.2014.2310225. For this purpose, the single modules, which are called energy storage modules in the present disclosure, have at least one energy storage element, such as a battery or a capacitor, and multiple switching elements. The switching elements are arranged in the respective modules to permit dynamic changeover of adjacent modules. This means that the multiple switching elements connect adjacent energy storage elements either in parallel or in series with one another or bypass or deactivate a respective energy storage element or a respective energy storage module. As a result of the switching elements required for this purpose being arranged in a respective module, the switching elements can be actuated with a minimum potential difference between the switching elements. This permits the switching elements to be actuated or activated precisely at the same time. The precise switching and the option of connecting adjacent modules in series or in parallel with one another allows such a battery to be dynamically reconfigured during operation, so that the battery can provide DC voltage, AC voltage or other forms of voltage. Conversely, however, this also means that the battery can be charged with DC voltage, AC voltage or other forms of voltage.

The invention also relates to an apparatus for charging an energy store that has at least three energy storage sections, each having multiple energy storage modules. The respective energy storage modules each comprise at least one energy storage element that receives and stores energy from an energy source, and at least two switching elements. The apparatus has at least one electrical connection between the energy store and a first coil. The first coil is designed to provide a voltage induced in the first coil to charge the energy storage elements of the energy storage modules of the energy store.

One embodiment of the apparatus has a respective electrical connection from a respective energy storage section to the first coil.

Another embodiment of the apparatus is designed to produce a respective voltage across a respective energy storage section.

Yet another embodiment of the apparatus has a charging connection apparatus configured to cause the electrical connection between the energy store and the first coil.

A development of the apparatus has a coil apparatus that comprises the first coil and a second coil.

The invention also relates to a vehicle having an embodiment of an apparatus according to the invention for implementing a refinement of the method according to the invention.

Further advantages and refinements of the invention can be found in the description and the accompanying drawings.

The features cited above and those to be explained below are usable in the respectively indicated combination and also in other combinations or on their own without departing from the scope of the invention.

The invention is schematically depicted in the drawings on the basis of embodiments and is described schematically and in detail with reference to the drawings, in which identical elements are provided with identical reference signs.

DETAILED DESCRIPTION

Figure 1:
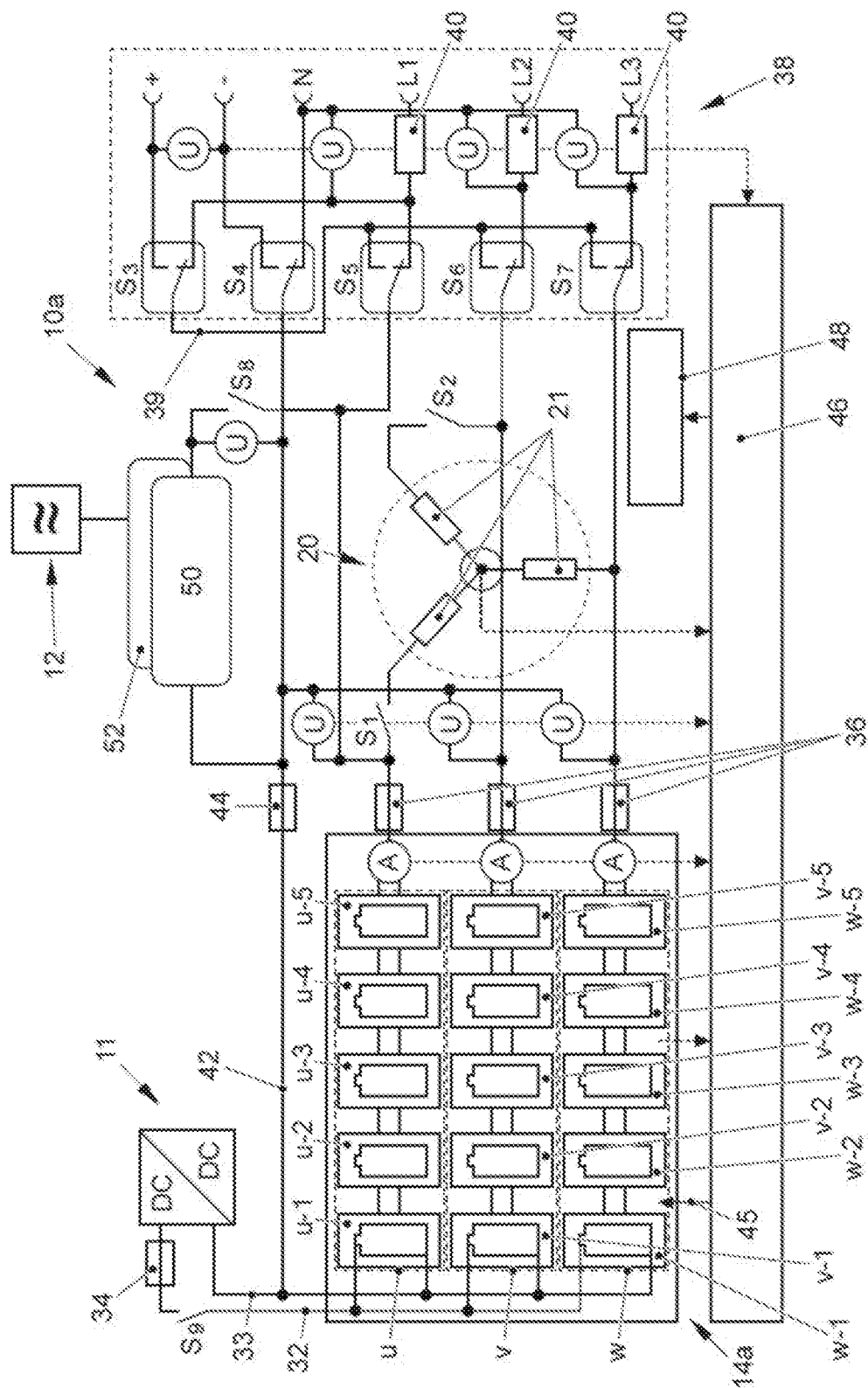
FIG. 1 shows an overview of a system circuit diagram of an embodiment of an apparatus according to the invention for charging an energy store using an embodiment of the method according to the invention.

FIG. 1 depicts a system circuit diagram 10a. An energy store 14a is electrically connected to a vehicle electrical system 11. The vehicle electrical system 11 is configured to use multiple voltage levels as load voltage for respective loads, for example 12 V and 48 V.

The energy store 14a in the exemplary embodiment shown in the present case has three energy storage sections u, v, w. Each energy storage section u, v, w has five energy storage modules u-1 to u-5, v-1 to v-5 and w-1 to w-5 in each case. In this instance, it should be noted that the number n of energy storage modules can be as desired and hence there may also be more than five energy storage modules, n always being a natural number. The positive pole of the vehicle electrical system 11 is connected to a positive connection of a respective energy storage module u-1 or v-1 or w-1 via an electrical connection 32 in each case. The negative pole of the vehicle electrical system 11 is connected to a negative connection of a respective energy storage module u-1 or v-1 or w-1 via an electrical connection 33 in each case. The forward line 32 from the positive pole of the vehicle electrical system 11 to the battery 14a contains a contactor 34 and a switch S9 arranged in series. Otherwise, the respective modules u-1 to u-5, v-1 to v-5 and w-1 to w-5 are each connected in parallel in the respective energy storage section u, v, w. Arranged at the motor-side end of the sections u, v, w (on the right-hand side in FIG. 1) is a respective ammeter denoted "A". Said ammeter has a respective contactor 36 connected downstream of it.

The sections u, v, w are each electrically connected to a respective winding section of a motor 20. The motor has three motor windings 21. There is a switch S1 arranged in the electrical connection from section u to the motor 20 and a switch S2 arranged in the electrical connection from the section v to the motor 20, in order to disconnect or connect said motor if need be depending on the operating function. The motor 20 has a charging connection apparatus 38 electrically connected to it. The charging connection apparatus 38, to charge the battery 14a, is connected to respective energy sources providing a charging voltage, possible energy sources being DC voltage sources and/or AC voltage sources. Essentially, the charging connection apparatus 38 is a plug-in connection for connection to a respective connector of the energy source.

The charging connection apparatus 38 has multiple connections L1, L2, L3 for connection to respective phases of a three-phase electrical system. In addition the charging connection apparatus 38 has a neutral connection N. Finally, the charging connection apparatus 38 has connections "+" and "−" for connection to a DC electrical system. To respectively connect or disconnect the respective connection L1, L2, L3, N, "+", "−", these each have a switch S3 to S7 connected downstream of them. The switch S4 is configured to switch between the connection "−" and the connection N. The switches S5, S6, S7 are configured to switch between the respective phase connection L1, L2, L3 or a coupling line 39. The switch S3 is configured to connect the connection "+" or the connection of the phase L1 to the coupling line 39. The connections L1, L2 and L3 moreover each have a coil 40. Arranged in parallel between the connection N and the respective connections L1, L2 and L3 is a respective voltmeter denoted by "U". A voltmeter denoted by "U" is moreover arranged between the connection "+" and the connection "−".

The connection N or the connection "−", depending on the respective position of the switch S4, has an electrical connection 42 to the negative pole of the vehicle electrical system 11 or to the electrical connection 33. The electrical connection 42 has a contactor 44. Voltmeters, each denoted by "U", are arranged between the electrical connection 42 and the respective sections u, v, w in a manner connected in parallel with the latter, so that a voltage between the respective section u, v, w and the electrical connection 42 is determinable.

Branching off from the electrical connection 42 between the contactor 44 and the switch S4 is an electrical connection to a first coil 50 or coupling coil 50. The electrical connection of the coupling coil 50 connects the coupling coil 50 to the switch S5 and to the energy storage section u. A switch S8 breaks the electrical connection between the coupling coil 50 and the switch S5 or the section u. A further voltmeter U is arranged between the electrical connection of the coupling coil 50 and the electrical connection 42.

The coupling coil 50 has an associated external second coil 52, which is not part of the apparatus. The external second coil 52 is connected to an energy source 12 providing an AC voltage.

The respective voltmeters "U" and ammeters "A", the motor 20 or a resolver of the motor 20 and the battery 14a send measurement data, such as e.g. individual cell voltages of the individual energy storage modules or the temperature, to a central controller 46 of the battery 14a, depicted by dashed arrows in the direction of the central controller 46. The central controller 46 has a high-speed bus 45 to control the respective switches of the energy storage modules u-1 to u-5, v-1 to v-5 and w-1 to w-5. The central controller 46 also has a switch controller 48 connected to it to control the switches S1 to S9.

Figure 2:
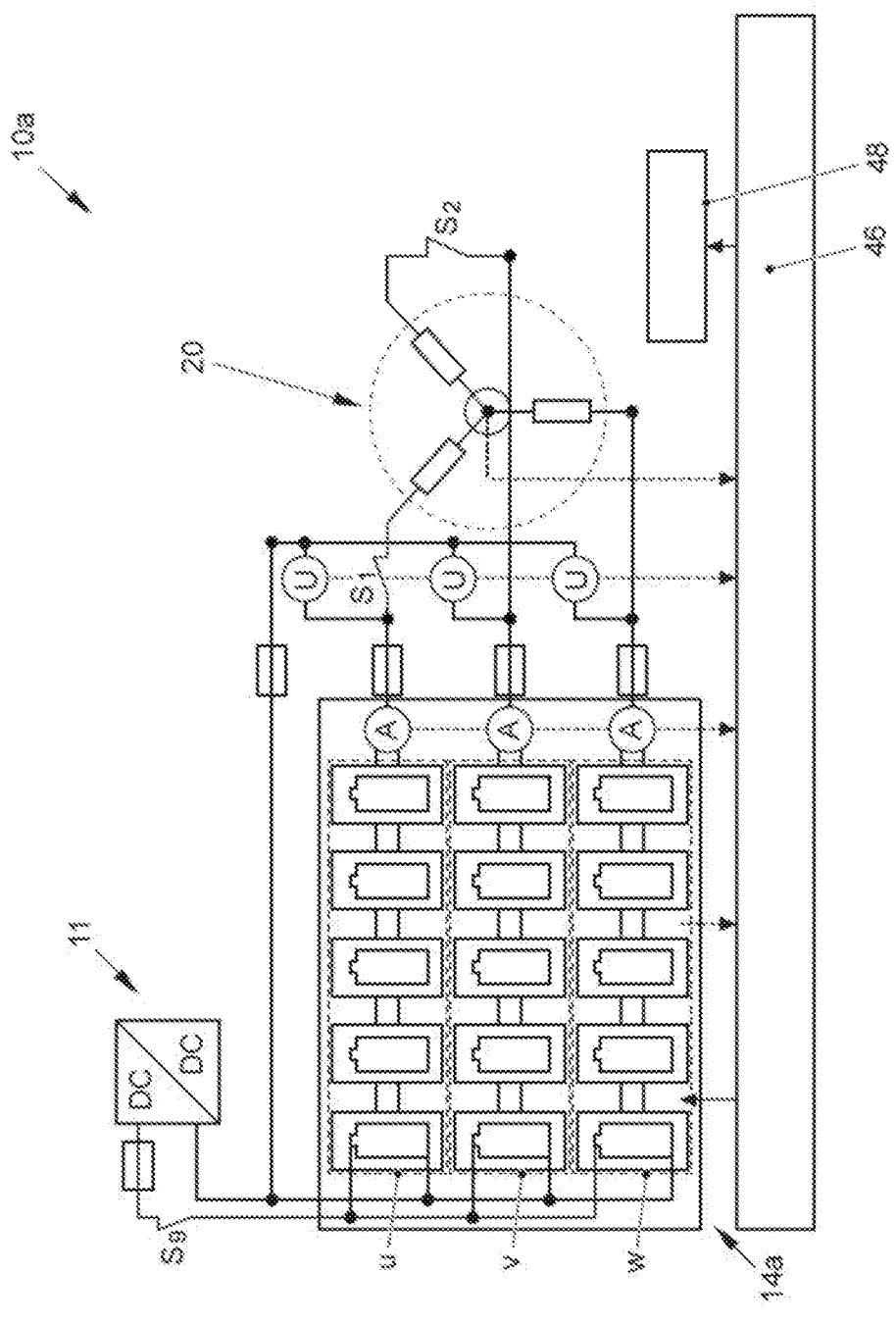
FIG. 2 shows a first functional state of the apparatus of the system circuit diagram of FIG. 1.

FIG. 2 shows the system circuit diagram 10a in a manner in which it is connected during motor operation, that is to say when the battery 14a supplies the motor 20 with power. For the sake of clarity, elements of the system circuit diagram 10a from FIG. 1 that are not needed are not shown.

For motor operation, the switch S9 is closed. As a result, the vehicle electrical system 11 has its respective positive pole and its respective negative pole electrically connected to the battery 14a. The switches S1 and S2 are also closed, as a result of which the battery 14a and the motor 20 are electrically connected to one another. The switches S3 to S7 are switched such that they perform no function, or the charging connection apparatus 38 is isolated. To this end, the switches S3 to S7 are open, or switched to a center position between the respective possible end positions, so that none of the end positions is electrically connected. For the switching elements S3 to S7, switching elements other than those shown, which permit an open position besides multiple further functional positions, are alternatively possible. The switch S8 is open in this operating state, so that the coupling coil 50 is isolated from the motor 20.

Figure 3:
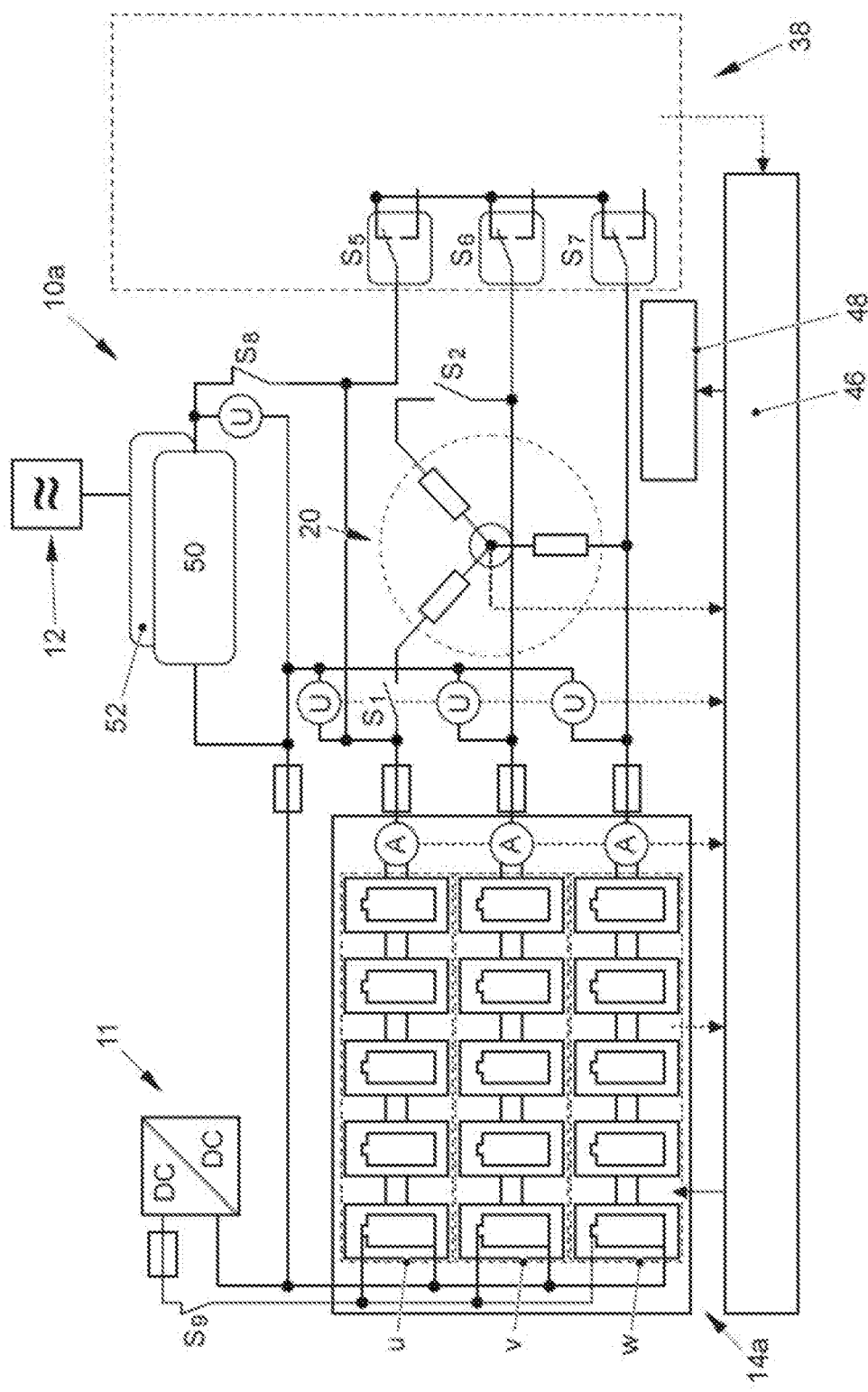
FIG. 3 shows a second functional state of the apparatus of the system circuit diagram of FIG. 1, in which the energy store is being charged.

FIG. 3 shows the system circuit diagram 10a of FIG. 1 in the switching state that exists when the energy store 14a is charged by means of the coupling coil 50, the switch S8 initially being open.

To this end, the vehicle having the apparatus or the system has driven e.g. to an appropriate charging apparatus, so that the coupling coil 50 is arranged in the effective range of the external second coil 52. The energy source 12 provides an AC voltage, on the basis of which a magnetic alternating field is produced in the coils 50, 52. On the basis of the magnetic alternating field, a voltage is then induced in the coil 50.

The voltmeters U measure the respective voltages present across the coupling coil 50 and the sections u, v, w. Before the switch S8 is closed, the respective voltages across the sections u, v, w are configured for a value common to the voltage of the coupling coil 50, so that there is no voltage difference between these components. This is accomplished by appropriately controlling the switching elements in the energy storage modules u-1 to u-5, v-1 to v-5, w-1 to w-5. As soon as this state has been reached, the switch S8 can be closed, as a result of which the coupling coil 50 is connected to the energy store 14a. The switches S5, S6, S7 are each switched such that they interconnect the respective sections or phases u, v, w. This is effected substantially such that they connect to the coupling line 39 (FIG. 1), as a result of which the coupling coil 50 is electrically connected to the sections v and w. An electrical connection to the section u is made possible by means of a separate electrical connection.

So that the energy store 14a can now be charged, the voltage of the energy store 14a is phase-shifted relative to the voltage of the coupling coil 50, so that a lower voltage is applied across each of the sections u, v, w of the energy store 14a than across the coupling coil 50. There is thus a voltage gradient for the voltage between the coupling coil 50 and the energy store 14a. On account of this voltage gradient, energy or current flows into the energy stores of the energy storage modules u-1 to u-5, v-1 to v-5, w-1 to w-5, thereby charging the latter.

The switch S9 is likewise closed, which means that the energy store 14a is connected to the vehicle electrical system 11. The low voltage for operating the contactors of the circuit diagram 10a is tapped from the star point of the energy store 14a.

Figure 4:
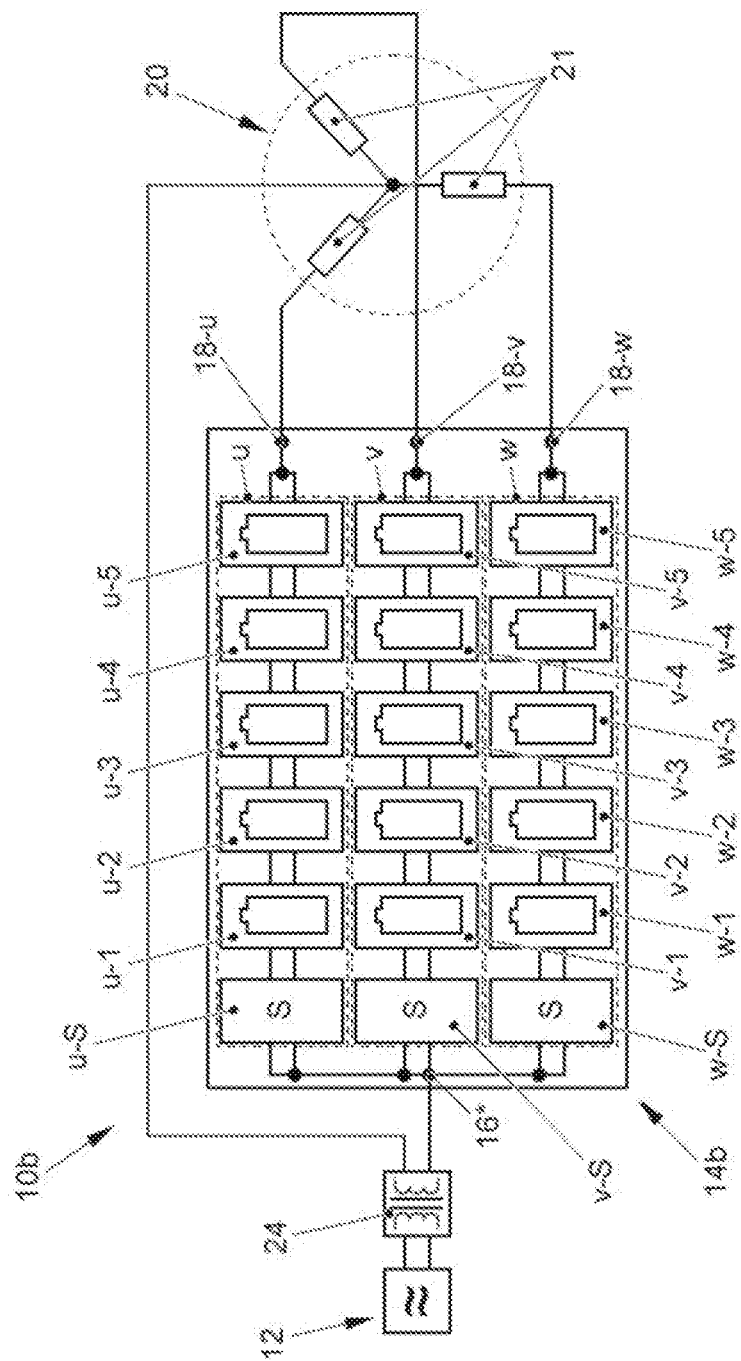
FIG. 4 shows an embodiment of the method according to the invention.

FIG. 4 shows the circuit diagram 10b, which depicts a further option for charging an energy store or a battery 14b with an AC voltage source as energy source 12 and a coil apparatus 24. The AC voltage source 12 is electrically connected to the battery 14b via a connection 16*. The coil apparatus 24 is arranged between the AC voltage source 12 and the connection 16*.

The battery 14b has, likewise depicted in exemplary fashion in the present case, three energy storage sections u, v, w, or battery sections u, v, w. The sections u, v, w are connected in parallel with one another. Each of the sections u, v, w has multiple energy storage modules u-1, u-2, u-3, u-4, u-5 or v-1, v-2, v-3, v-4, v-5 or w-1, w-2, w-3, w-4, w-5, which are also referred to as battery modules. In the present case too, it should again be noted that the number n of energy storage modules may be as desired and hence there may also be more than five energy storage modules present per section, n always being a natural number. Each section u, v, w additionally has a switch module u-S, v-S, w-S as well. Such a respective switch module u-S, v-S, w-S can be a MOSFET, for example. The MOSFET reduces the dual tap of the modules u-1, v-1, w-1 to one tap. The respective modules u-1 to u-5 and u-S, v-1 to v-5 and v-S, w-1 to w-5 and w-S are each connected in parallel with one another within their respective section. A respective connection 18-u, 18-v, 18-w electrically connects the sections u, v, w, or the battery 14b, to a motor 20. The motor 20 corresponds to the motor 20 depicted in the figures described above and has three winding or phase sections having the windings 21.

The embodiment shown in FIG. 4 also has a coil apparatus 24 in the form of a transformer 24, connected downstream of the AC voltage source 12. This galvanically isolates the AC voltage source 12 from the energy store 14b, thereby addressing safety aspects of the circuit. The coil apparatus 24 has substantially two coils. In comparison with the embodiment shown in FIGS. 1 to 3, the first coil 50 and the second coil 52 are combined in the coil apparatus 24 in this embodiment.

The embodiment shown in FIG. 4 allows direct, single-phase charging of the battery 14b. The return line to the energy source 12 is provided by the star point of the motor 20. To form an AC voltage sink, the battery 14b is regulated upward to the current of the energy source 12. This means that the battery 14b is matched to the energy source 12, or to the voltage provided by the first coil 50.

Crucial aspects of this charging method are the frequency and voltage of the energy source 12, or of the AC voltage provided by the coupling coil 50. In this regard, the respective battery modules u-1 to u-5, v-1 to v-5 and w-1 to w-5 are connected such that the respective sections u, v, w correspond to the frequency and voltage of the coil apparatus 24. The energy source 12 provides a charging voltage at a specific frequency. On the basis of the respective properties of the coil apparatus 24 having the first and second coils 50, 52, the coil apparatus provides the energy store 14b with an appropriately altered voltage. As explained at the outset, the respective battery modules u-1 to u-5, v-1 to v-5 and w-1 to w-5 have multiple switching elements permitting the respective modules u-1 to u-5, v-1 to v-5 and w-1 to w-5, or the energy storage elements arranged in the respective modules, to be dynamically changed over between connection in parallel and/or connection in series with one another. This allows respective frequencies and voltages in the respective modules u-1 to u-5, v-1 to v-5 and w-1 to w-5, or in the battery sections u, v, w, to be adjusted, so that the battery 14b can be matched to the provided frequency and voltage of the coil apparatus 24. This also requires the switch modules u-S, v-S and w-S. Since only a partial voltage is applied across each of the respective sections u, v, w, the switch modules u-S, v-S and w-S merge the sections u, v, w into a common star point of the battery 14b. The star point 16* of the battery 14b can be used to supply the AC voltage provided by the coil apparatus 24 centrally.

The return line via the star point of the motor 20 means that the motor 20 does not need to be isolated from the battery 14b during the charging process. However, the respective modules of the first voltage stage are decoupled, i.e. they become individually actuatable, so that they can also be connected in parallel, in series or in the form of a bypass with respect to respective adjacent modules. Otherwise, just a parallel connection would be possible.

Figure 5:
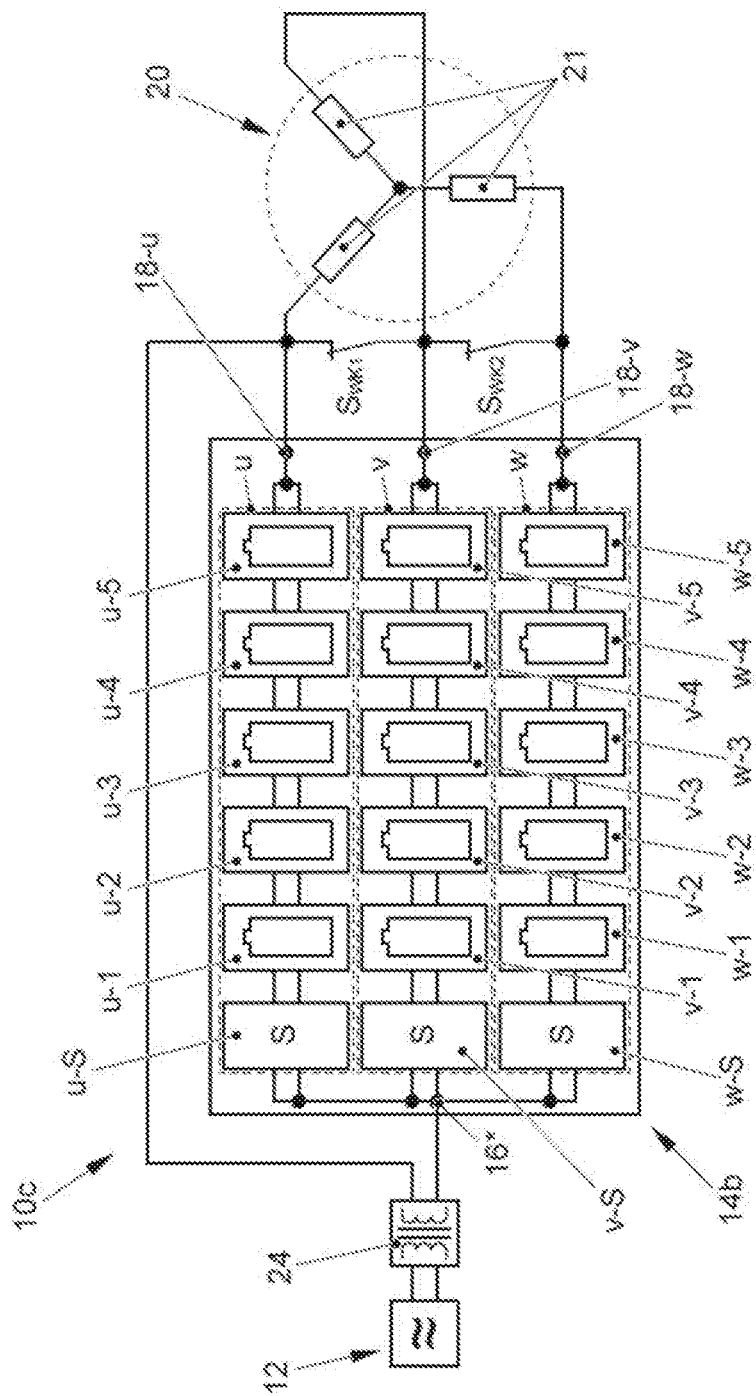
FIG. 5 shows a further embodiment of the method according to the invention.

The circuit diagram 10c shown in FIG. 5 corresponds substantially to the circuit diagram 10b shown in FIG. 4, the circuit diagram 10c of FIG. 5 having two switches SWK1, SWK2 arranged between the connections 18-u, 18-v, 18-w, by means of which the battery 14b is connected to the respective winding sections, or to the respective windings 21, of the motor 20. The switch SWK1 is arranged between the connections 18-u and 18-v. The switch SWK2 is arranged between the connections 18-v and 18-w. The embodiment shown in FIG. 5 has the coil apparatus 24, which galvanically isolates the energy source 12 from the battery 14b.

In the embodiment shown in FIG. 5, the battery 14b is charged directly, using a single phase, with the motor 20, or the sections having the windings 21 (winding sections) of the motor 20, being shorted via the switches SWK1 and SWK2. As a result, the motor 20 does not need to be isolated from the battery 14b during the charging process, and no voltage drops occur across the windings 21 of the motor 20. The sections are shorted by virtue of the switches SWK1 and SWK2 each being closed. This may require the switches SWK1, SWK2 to be actuated (not shown).

Figure 6A:
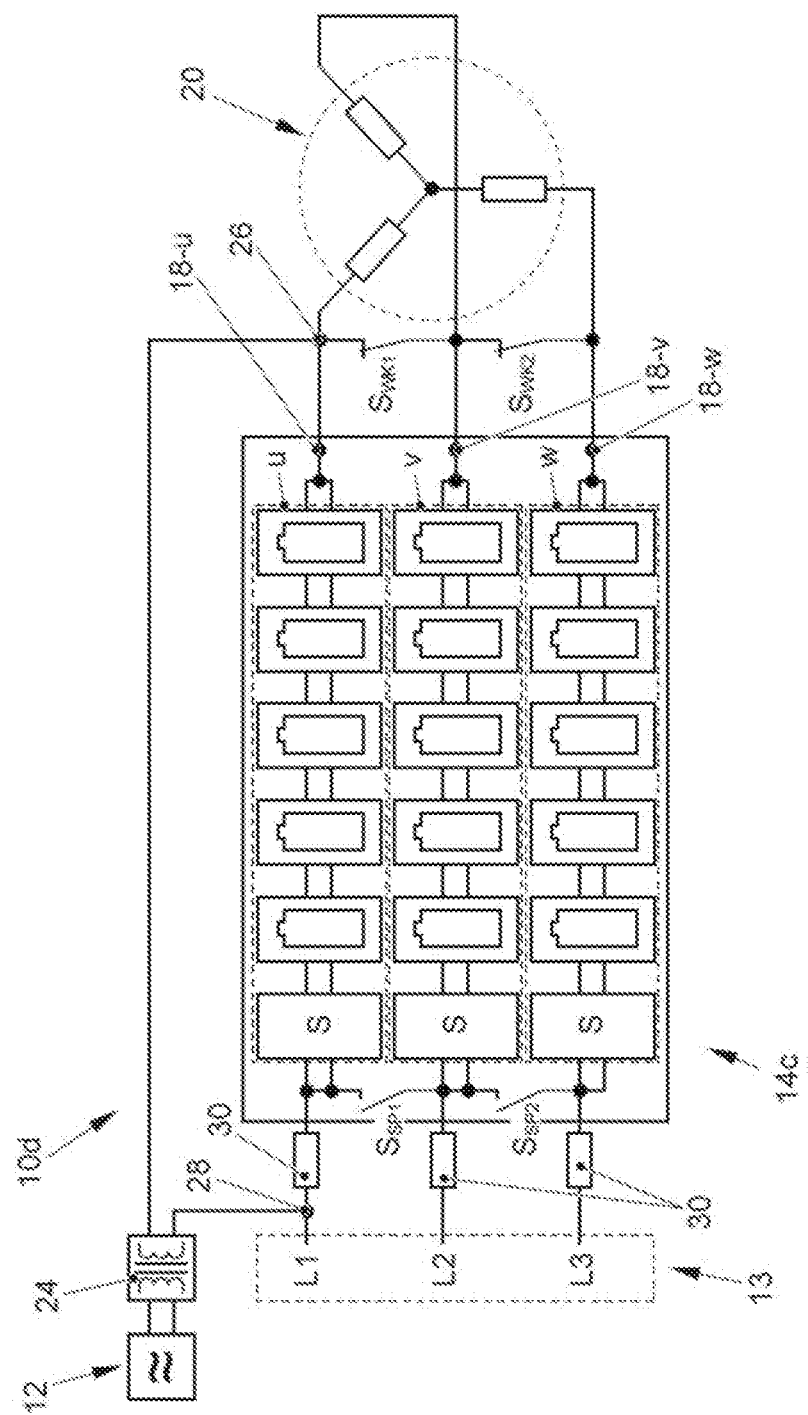
FIGS. 6a and 6b show yet further embodiments of the method according to the invention.
Figure 6B:
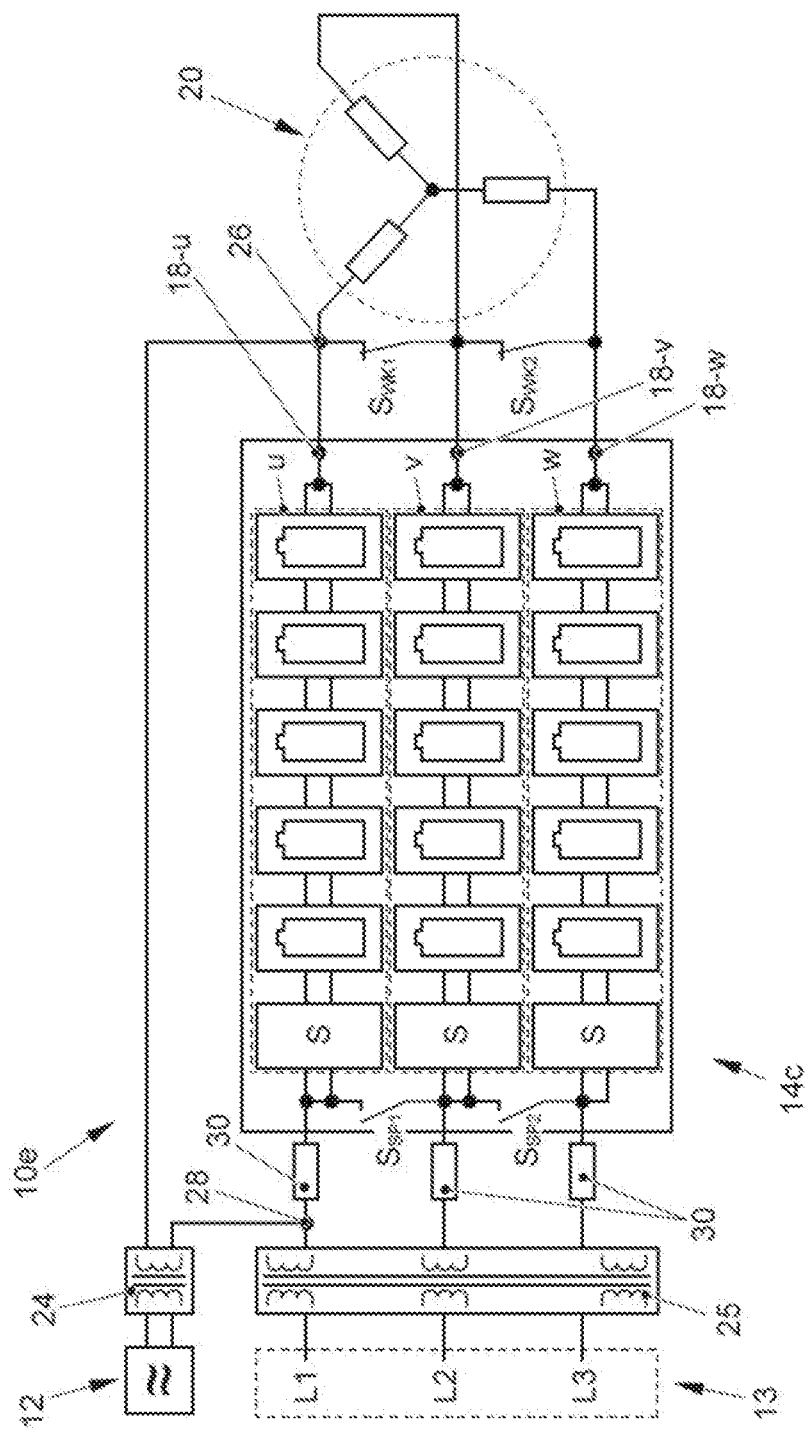

FIGS. 6a and 6b show further options for charging an energy store 14c. In this regard, FIGS. 6a and 6b show circuit diagrams 10d and 10e showing embodiments in which the battery 14c is electrically connected to two voltage sources 12, 13. The embodiments of FIGS. 6a and 6b that are described below allow the energy store 14c to be charged by means of AC current either using a single phase or using three phases. At any rate, the embodiments of FIGS. 6a and 6b each have provision for a three-phase voltage source 13, which has multiple phases, and each have provision for the voltage source 12 shown above, which has just one phase.

The respective energy storage modules of the energy storage sections u, v, w are each connected in parallel with one another. Switches SSP1 and SSP2 disconnect the star point of the battery 14c. To charge the battery 14c by means of the three-phase voltage source 13, the switches SSP1 and SSP2 are open. To charge the battery 14c by means of the single-phase voltage source 12, the switches SSP1 and SSP2 need to be closed, so that the energy source 12 is incorporated via the star point of the energy store 14c. The energy source 12 is connected to the battery 14c via a connection 26 and via a connection 28.

The embodiments shown in the circuit diagrams 10d and 10e have the switches SWK1 and SWK2, which are arranged between the sections of the motor 20 in order to interconnect the sections of the motor 20.

The circuit diagrams 10d and 10e moreover have three coils 30. Each coil 30 is electrically connected to a phase L1, L2, L3 of the energy source 13 and to a respective connection of the battery 14c.

In the circuit diagram 10e shown in FIG. 6b, the charger 13 has a coil apparatus 25, or a transformer 25, connected downstream of it, for galvanic isolation.

In the circuit diagrams 10d and 10e shown in FIGS. 6a and 6b, respectively, the single-phase AC voltage source 12 has a coil apparatus 24 connected downstream of it. The coil apparatus 24 has the first coil 50 and the second coil 52.

The apparatus according to the invention can be used e.g. in electric vehicles. The inductive charging via the coupling coil 50 allows a cable connection between vehicle and charging device to be dispensed with. As a result of the energy storage modules being able to be connected as desired, they are matchable to any provided voltage. By way of example, the coupling coil 50 can provide frequencies in the range from 15 kHz to 20 kHz or more, which can be supplied directly to the energy store 14a, 14b, 14c. The switching elements of the energy storage modules can match the energy store to such a frequency.

The invention claimed is:

1. A method for charging an energy store (14a, 14b, 14c) that has at least three energy storage sections (u, v, w), each of the energy storage sections (u, v, w) having multiple energy storage modules (u-1 to u-5, u-n, v-1 to v-5, v-n, w-1 to w-5, w-n), and each of the energy storage modules (u-1 to u-5, u-n, v-1 to v-5, v-n, w-1 to w-5, w-n) comprising at least one energy storage element that receives and stores energy from an external energy source (12, 13), and at least two switching elements that are operative selectively for connecting the energy store (14a, 14b, 14c) to a first coil (50) that is alignable with a second coil (52) of the external energy source so that a voltage is induced in the first coil (50) to charge the energy storage elements of the energy storage modules (u-1 to u-5, u-n, v-1 to v-5, v-n, w-1 to w-5, w-n) of the energy store (14a, 14b, 14c), the at least two switching elements further being operative selectively for connecting the energy store (14a, 14b, 14c) to a charging connection apparatus (38) that is connectable to the external energy source to charge the energy storage elements, the method comprising:
switching the switching elements so that the respective energy storage modules (u-1 to u-5, u-n, v-1 to v-5, v-n, w-1 to w-5, w-n) of an energy storage section (u, v, w) are each connected in parallel or in series with one another and/or at least one energy storage module (u-1 to u-5, u-n, v-1 to v-5, v-n, w-1 to w-5, w-n) of at least one energy storage section (u, v, w) is bypassed, and thereby matching the energy store (14a, 14b, 14c) to properties of the voltage provided by the first coil (50);
controlling the switching elements in the energy storage modules (u-1 to u-5, v-1 to v-5, w-1 to w-5) so that the respective voltages across the energy storage sections (u, v, w) are configured for a value common to the voltage of the first coil (50);
switching the switching elements of the energy storage modules (u 1 to u-5, v-1 to v-5, w-1 to w-5) so that the voltage of the energy store (14a, 14b, 14c) is phase-shifted relative to the voltage of the first coil (50) to produce across a respective energy storage section (u, v, w) a lower voltage than is provided by the first coil (50) and thereby charging the energy store (14a, 14b, 14c); and
routing the electrical connection between the first coil (50) and the energy store (14a) via the charging connection apparatus (38).

2. The method as claimed in claim 1, wherein a respective energy storage section (u, v, w) is electrically connected to the first coil (50).

3. The method as claimed in claim 1, wherein the first coil (50) is assigned a second coil (52) that is connected to an energy source (12).

4. The method as claimed in claim 1, further comprising keeping the energy store (14a) connected to a vehicle electrical system (11) of a vehicle during a charging process.

5. The method as claimed in claim 1, wherein the energy store (14a, 14b, 14c) is an AC battery.

6. An apparatus (10a to 10e) for charging an energy store (14a, 14b, 14c) that has at least three energy storage sections (u, v, w), each of the energy storage sections having multiple energy storage modules (u-1 to u-5, u-n, v-1 to v-5, v-n, w-1 to w-5, w-n) and each of the energy storage modules (u-1 to u-5, u-n, v-1 to v-5, v-n, w-1 to w-5, w-n) comprising at least one energy storage element that receives and stores energy, the apparatus comprising: a first coil (50) disposed to be alignable with a second coil (52) that is external of the apparatus and that is associated with a first energy source (12, 13); a charging connection apparatus (38) having connectors (L1, L2, L3) for plug-in connection to a second energy source; and electrical connection lines and switch elements disposed and operative so that, in first orientations, the switch elements enable a voltage induced in the first coil (50) to charge the energy storage elements of the energy storage modules (u-1 to u-5, u-n, v-1 to v-5, v-n, w-1 to w-5, w-n) of the energy store (14a, 14b, 14c) via the charging connection apparatus (38), and, in a second orientation, the switch elements enable voltage from the second energy source to charge the energy storage elements of the energy storage modules (u-1 to u-5, u-n, v-1 to v-5, v-n, w-1 to w-5, w-n) of the energy store (14a, 14b, 14c), wherein initially controlling the switching elements in the energy storage modules (u-1 to u-5, v-1 to v-5, w-1 to w-5) enables the respective voltages across the energy storage sections (u, v, w) to be configured for a value common to the voltage of the first coil (50), and subsequent controlling of the switching elements enables the voltage of the energy store (14a, 14b, 14c) to be phase-shifted relative to the voltage of the first coil (50) to produce across a respective energy storage section (u, v, w) a lower voltage than is provided by the first coil (50) and thereby charging the energy store (14a, 14b, 14c).

7. The apparatus (10a to 10e) as claimed in claim 6, wherein the apparatus has electrical connections from the respective energy storage sections (u, v, w) to the first coil (50).

8. The apparatus (10a to 10e) as claimed in claim 7, wherein the energy store (14a, 14b, 14c) is designed to produce a respective voltage across a respective energy storage section (u, v, w).

9. The apparatus as claimed in claim 8, wherein the charging connection apparatus (38) is configured to cause the electrical connection between the energy store (14a, 14b, 14c) and the first coil (50).

10. The apparatus as claimed in claim 7, further comprising a coil apparatus (24) that comprises the first coil (50) and a second coil (52).

11. A vehicle having the apparatus of claim 6.

* * * * *